United States Patent [19]

Gottschalk

[11] 4,362,366
[45] Dec. 7, 1982

[54] FOCAL LENGTH EXTENDER

[75] Inventor: Robert E. Gottschalk, Los Angeles, Calif.

[73] Assignee: Panavision, Incorporated, Tarzana, Calif.

[21] Appl. No.: 172,939

[22] Filed: Jul. 28, 1980

[51] Int. Cl.³ .............................................. G02B 13/08
[52] U.S. Cl. ................................................... 350/420
[58] Field of Search ......................................... 350/420

[56] References Cited

U.S. PATENT DOCUMENTS

| 2,752,821 | 7/1956 | Cook | 350/420 |
| 2,890,622 | 6/1959 | Wallin | 350/420 |
| 2,915,942 | 12/1959 | Cook | 350/420 |
| 2,940,372 | 6/1960 | Ehrenhaft et al. | 350/420 |
| 3,041,935 | 7/1962 | Jacobsen | 350/420 |
| 3,428,398 | 2/1969 | Gottschalk | 350/420 |
| 3,871,748 | 3/1975 | Day | 350/420 |
| 3,990,785 | 11/1976 | Hirose | 350/420 |

Primary Examiner—John K. Corbin
Assistant Examiner—Rebecca D. Gass
Attorney, Agent, or Firm—Lyon & Lyon

[57] ABSTRACT

An improved focal length extender of the anamorphic type is disclosed for use in combination with a conventional primary lens. The lens system of the present invention comprises two portions. A first portion is positioned in front of the conventional lens, and a second portion of the lens system of the present invention is placed between the conventional lens and the film plane. The first and second portions cooperate together and with the conventional lens system to provide increased focal length while at the same time providing relatively reduced mass and bulk at increased optical speed.

1 Claim, 4 Drawing Figures

FOCAL LENGTH EXTENDER

FIELD OF THE INVENTION

The present invention relates generally to photographic lens systems, and more particularly to supplemental lens systems for increasing the focal length of a primary lens.

BACKGROUND

Lens systems adapted for use with a primary lens for increasing focal length have been known and used for some time in many areas of photography. Similarly, anamorphic lens systems have long been used in photography, and in cinematography, where such lenses are used to reduce the amount of film required to store a quantum of information such as a scene.

In a typical application, the focal length extender comprises a lens system adapted to be directly coupled to a primary lens system. In the case of anamorphic adapters, it is known to place the entire anamorphic adapter in front of the conventional lens system, such as shown in U.S. Pat. No. 2,940,372. A similar arrangement is shown in U.S. Pat. No. 2,752,821, and smaller devices are disclosed in U.S. Pat. Nos. 2,940,372 and 3,041,935. It is also known to place the entire adapter between the primary lens and the film plane. Focal length extenders using spherical lenses have generally been placed between the film plane and the primary lens.

In specialized applications, such as where unit magnification together with variation of the anamorphotic effect is required, it is known to place part of the supplemental lens in front of a spherical lens and part behind the spherical lens, as shown in U.S. Pat. No. 3,871,748. Another variable anamorphic lens system is disclosed in U.S. Pat. 3,428,398. Complete anamorphic lens systems are disclosed in U.S. Pat. Nos. 2,890,622, 3,990,785 and 2,915,942.

Focal length extenders for typical application have generally imposed undersirable limitations in that such supplemental lens systems intended for use on the front of conventional lens systems have been massive and unwieldy because of the necessary large size thereof to prevent loss of light or vignetting, and further off-axis optical quality has frequently been inferior because of the difficulty of balancing aberrations across a large lens. In a related manner, focal length extenders on the order of two power intended for use between the film plane and the primary lens, while smaller and lighter, result in an aperture decrease on the order of a full stop or more. In addition, such post-objective adapters which are relatively small in diameter must be manufactured to extremely close tolerances to maintain good optical quality.

Thus there has been a need for a supplemental focal length extender having good optical quality with good optical speed and low mass, and which is adaptable to anamorphic applications.

SUMMARY OF THE INVENTION

The present invention overcomes many of the drawbacks of the prior art by providing a supplemental focal length extender, which may be of an anamorphic configuration, having increased speed relative to post-objective adapters and having reduced mass without sacrifice in optical quality relative to pre-objective adapters.

More particularly, the present invention comprises an adapter having two portions or sections which are optically coupled through and with the primary or conventional lens system. The first portion of the adaptor comprises a multi-element group positioned between the primary lens system and the film plane. Similarly, the second portion comprises a multi-element group adapted to be coupled to the front of the primary lens, thereby being optically coupled to the first portion of the adapter through the primary lens. In the event the supplemental lens system is configured to provide an anamorphotic effect, the first and second portions may be configured for effect an orthogonal axes.

It is therefore one object of the present invention to provide an improved anamorphic lens attachment.

It is a further object of the present invention to provide a lens system having improved optical speed and weight characteristics.

These and other objects of the present invention will be better appreciated from the following specification taken with the attached Figures, in which FIG. 1a is a cross-sectional side view of an exemplary embodiment of the invention, taken along the section lines AA and BB as shown in a frontal diagrammatic view of the lens in FIG. 1b.

FIG. 2 is a side view of the rear portion of an exemplary embodiment of the invention, and FIG. 3 is a side view of the front portion of an exemplary embodiment of the invention.

DETAILED DESCRIPTION OF THE INVENTION

Figure 1:
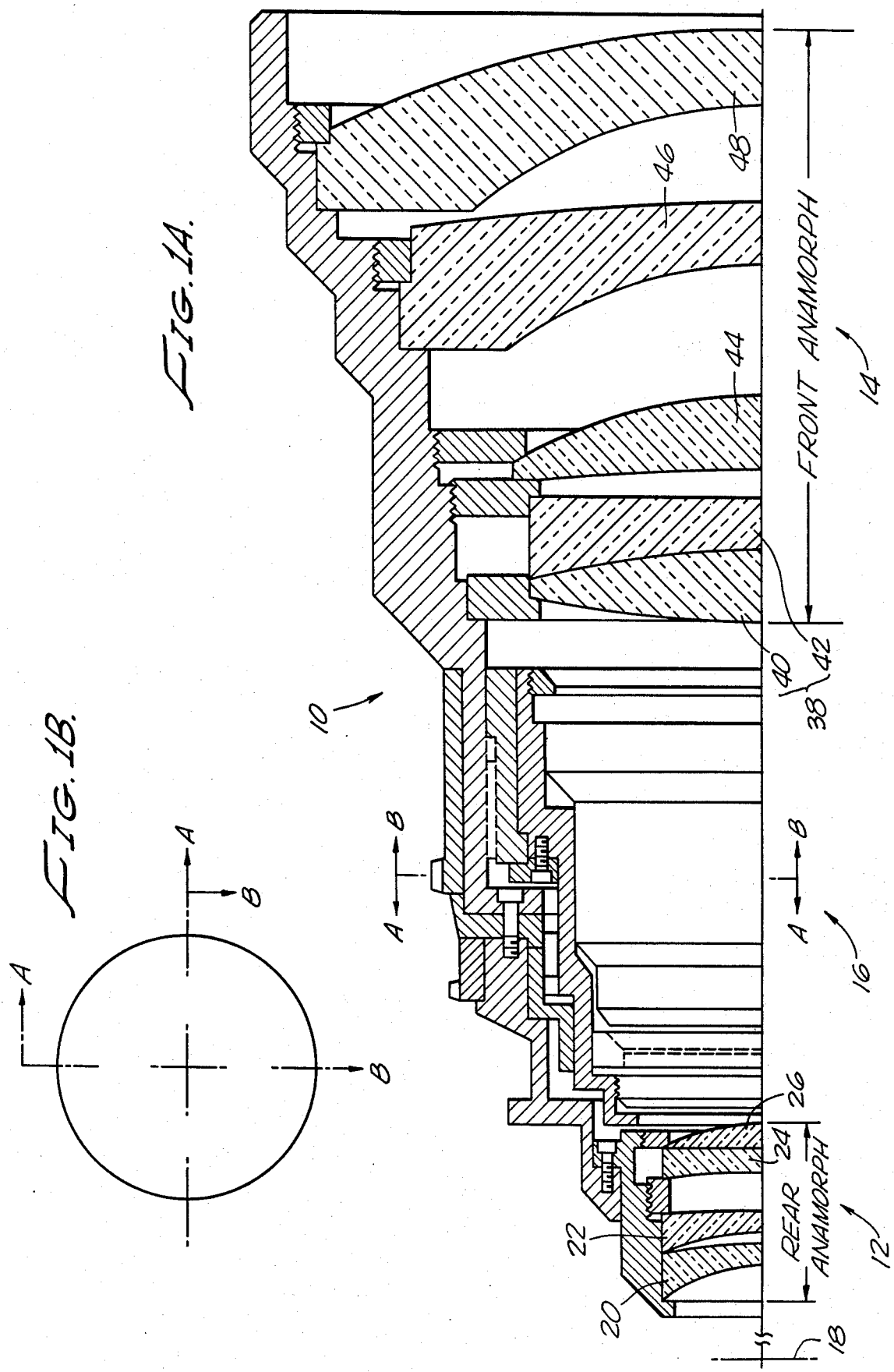

Referring first to FIGS. 1a and 1b, a lens 10, according to the present invention, comprises a rear portion 12 together with a front portion 14. The rear portion 12 is located on the optical axis between a conventional or primary lens systems 16 (which is only shown diagrammatically) and a film plane 18, and may be configured as a vertical anamorphoser. The front portion 14 is located on the optical axis in front of the conventional lens system 16 and may be configured as a horizontal anamorphoser, as indicated by the section lines of FIG. 1b and corresponding sections depicted in FIG. 1a. For the exemplary embodiment of the rear and front portions 12 and 14 shown in FIGS. 2 and 3, the lens 16 of FIG. 1a preferably has a variable focal length of 25–250 mm with a maximum aperture of T4, such as that manufactured by Angenieux.

Figure 2:
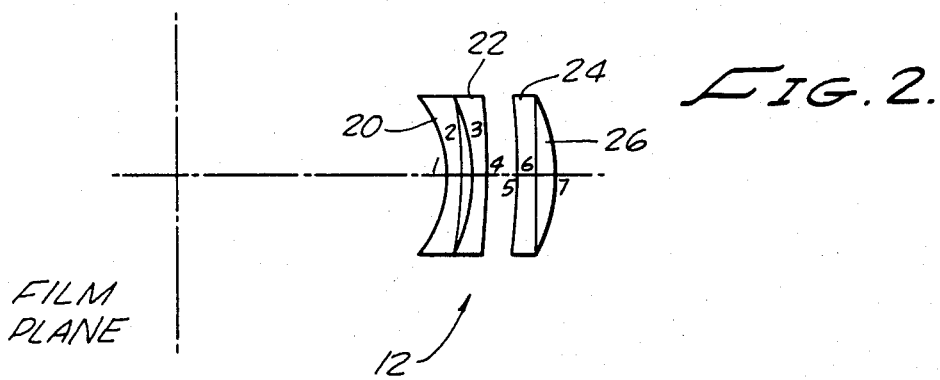

Referring to FIG. 2, which provides the same vertical cross-section as shown in FIG. 1a but shows the full half of the lens, the rear portion 12 of the lens 10 comprises a first element 20 arranged in an air spaced doublet relationship with a second element 22. A third element 24 and a fourth element 26 are arranged in a cemented doublet configuration and are spaced relatively apart from the elements 20 and 22. The specific characteristics which define the elements of the rear portion 12 are set forth below in Table I, in which the surfaces 1 and 2 refer to the element 20, beginning with the left-most surface and so on, as shown in FIG. 2. Conventional use is made of plus and minus signs to indicate the origin of the radius of curvature for each of the lens surfaces, and dimensions are given in inches.

TABLE I

| SUR-FACE | RADII | HEIGHT | WIDTH | INDEX OF REFRACTION | DISTANCE |
|---|---|---|---|---|---|
| 1 | +.769 | .786 | 1.000 | 1.620 | .100 |
| 2 | +2.571 | .864 | " | | .060 |
| 3 | +1.176 | .872 | " | 1.620 | .100 |
| 4 | +6.994 | .976 | " | | .200 |
| 5 | +6.667 | 1.000 | " | 1.621 | .120 |
| 6 | +20.000 | 1.000 | " | 1.620 | .120 |
| 7 | +1.206 | 1.000 | " | | |

Where an anamorphic configuration of the lens 10 is desired, the elements 20, 22, 24 and 26 are each cylinder lenses. If no anamorphic effect is required, spherical lenses may be used for each element. The embodiment shown in FIGS. 1-3 may be arranged for afocal applications wherein the elements are disposed for focus at infinity. If shorter focus is required, the air spacing may be collapsed in a manner known in the art.

Figure 3:
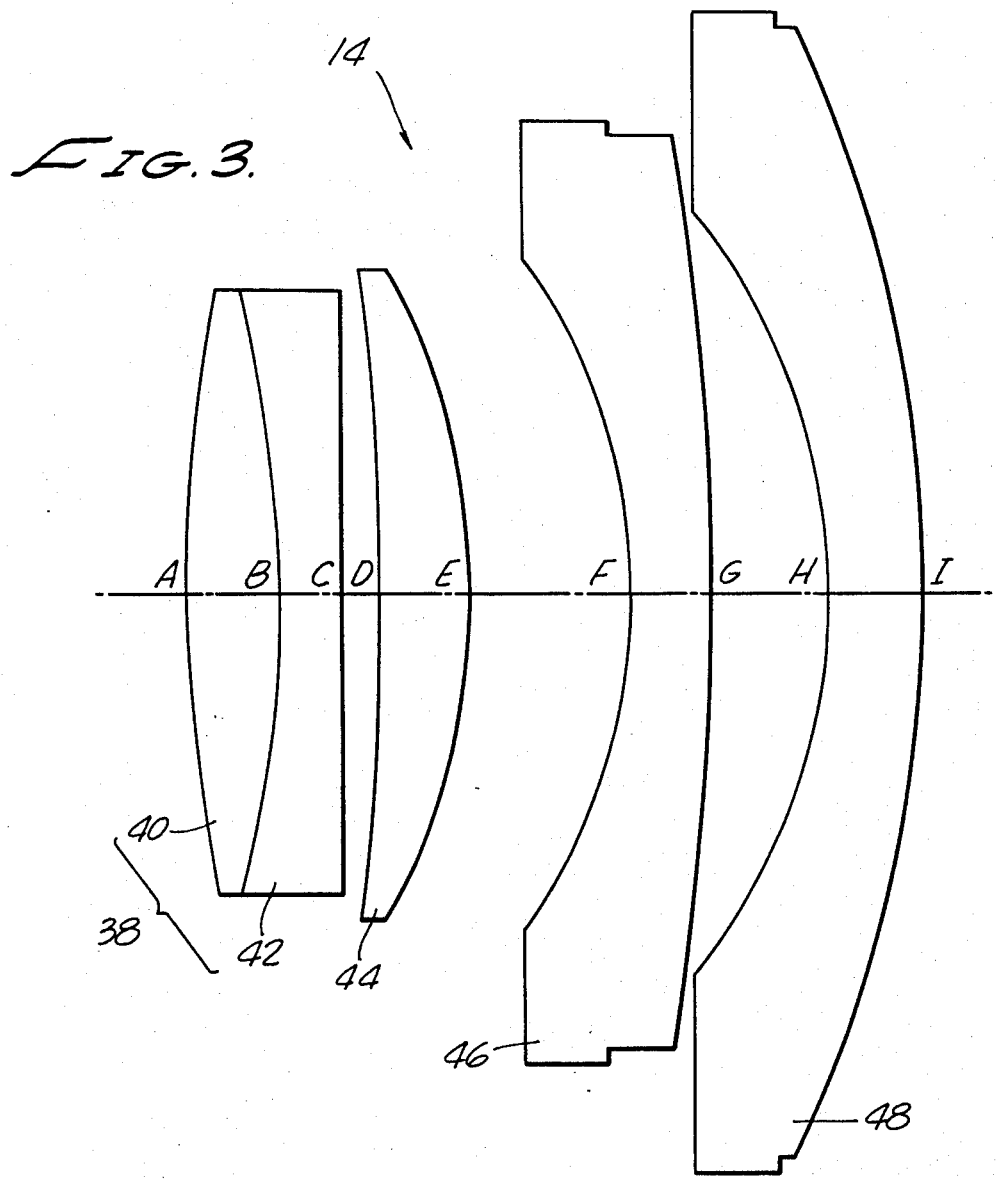

Referring next to FIG. 3, the elements which comprise the front portion 14 of the lens 10 of FIG. 1a are shown in detail. A cemented doublet 38 is formed from a biconvex element 40 taken together with a concavo-plano second element 42. A concavo-convex third element 44 is spaced apart from the doublet 38. The remaining elements of the front portion 14 are comprised of a concavo-convex element 46 and a second concavo-convex element 48, both spaced apart from the elements 44. The characteristics of each of the elements of the front portion 14 are set forth below in Table II.

TABLE II

| SURFACE | RADII | WIDTH | HEIGHT | DIAGONAL | INDEX OF REFRACTION | DISTANCE |
|---|---|---|---|---|---|---|
| A | −9.524 | 3.330 | 1.900 | 3.834 | 1.620 | .620 |
| B | +7.143 | 3.434 | 2.102 | 4.026 | 1.621 | .400 |
| C | PLANO | 3.674 | 2.230 | 4.300 | | .250 |
| D | +17.551 | 3.772 | 2.364 | 4.450 | 1.621 | .600 |
| E | +4.307 | 3.888 | 2.556 | 4.653 | | 1.072 |
| F | +3.571 | 4.044 | 3.126 | 5.111 | 1.620 | .500 |
| G | +18.845 | 4.636 | 3.286 | 5.682 | | .800 |
| H | +3.846 | 4.740 | 3.712 | 6.020 | 1.620 | .600 |
| I | +8.431 | 5.946 | 3.906 | 7.114 | | |

For the particular embodiment shown in FIGS. 2 and 3, the rear portion 12 and the front portion 14 of the lens 10 each provide a power of 1.414X, such that the focal length of a system compring the supplemental lens 10 and the primary lens 16 has a focal length of 35.35.–353.5 mm with a maximum aperture of T4.8. A prior art, post-objective anamorphic adapter would typically be two power and would result, in combination with this same primary lens 16, in a 50–500 mm lens systems with a maximum aperture of T5.6. Thus the lens of the present system is approximately one-half stop faster than prior art post-objective, anamorphic afocal adapters.

It is to be understood that the exact amount of magnification provided by the rear portion 12 and the front portion 14 of the lens system 10 need not be equal to provide at least some of the benefits of the present invention. Thus, the focal length extender 10 may be configured such that the rear portion 12 provides a power of 1.33X, while the front portion 14 provides a power of 1.5X. For this configuration, the combination of the supplementary lens 10 and the same primary lens 16 described above results in a system having a total focal length of 33.25–332.5 mm with a maximum aperture of T4.5. Alternatively, the secondary lens 10 may be configured for use with the same primary lens 16 such that the rear portion 12 provides a power of 1.5X while the front portion 14 provides a power of 1.33X, resulting in a combined focal length of 37.5–375 mm with a maximum aperture of T5.

In accordance with the present invention, it can be seen that there has been disclosed a novel focal length extender which may be configured in an anamorphic arrangement and which provides improved optical and mechanical characteristics including reduced mass and relatively increased optical speed. It is to be understood that, given the teachings herein, numerous alternatives and equivalents which do not depart from the spirit of the invention will be apparent to those skilled in the art, and are intended to be included herein.

What is claimed is:

1. A lens system having a front portion and a rear portion in which the rear portion is described by the following table:

| SURFACE | Radii | Height | Width | Index Of Refraction | Distance |
|---|---|---|---|---|---|
| 1 | +.769 | .786 | 1.000 | 1.620 | .100 |
| 2 | +2.571 | .864 | " | | .060 |
| 3 | +1.176 | .872 | " | 1.620 | .100 |
| 4 | +6.994 | .976 | " | | .200 |
| 5 | +6.667 | 1.000 | " | 1.621 | .120 |
| 6 | +20.000 | 1.000 | " | 1.620 | .120 |
| 7 | +1.206 | 1.000 | " | | | and the front portion is described by the following table:

| SURFACE | Radii | Width | Height | Diagonal | Index Of Refraction | Distance |
|---|---|---|---|---|---|---|
| A | −9.524 | 3.330 | 1.900 | 3.834 | 1.620 | .620 |
| B | +7.143 | 3.434 | 2.102 | 4.026 | 1.621 | .400 |
| C | PLANO | 3.674 | 2.230 | 4.300 | | .250 |
| D | +17.551 | 3.772 | 2.364 | 4.450 | 1.621 | .600 |
| E | +4.307 | 3.888 | 2.556 | 4.653 | | 1.072 |
| F | +3.571 | 4.044 | 3.126 | 5.111 | 1.620 | .500 |
| G | +18.845 | 4.636 | 3.286 | 5.682 | | .800 |
| H | +3.846 | 4.740 | 3.712 | 6.020 | 1.620 | .600 |
| I | +8.431 | 5.946 | 3.906 | 7.114 | | |

* * * * *

UNITED STATES PATENT AND TRADEMARK OFFICE
CERTIFICATE OF CORRECTION

PATENT NO. : 4,362,366

DATED : December 7, 1982

INVENTOR(S) : Robert E. Gottschalk

Page 1 of 2

It is certified that error appears in the above—identified patent and that said Letters Patent is hereby corrected as shown below:

Column 1, line 25, "smaller" should read --similar--.

Column 3, line 47, "comprising" is misspelled.

Column 3, line 53, "systems" should read --system--.

Column 3, Table I, should appear as shown below.

TABLE I

| SURFACE | RADII | HEIGHT | WIDTH | INDEX OF REFRACTION | DISTANCE |
|---|---|---|---|---|---|
| 1 | + .769 | .786 | 1.000 | | |
| | | | | 1.620 | .100 |
| 2 | + 2.571 | .864 | " | | |
| | | | | | .060 |
| 3 | + 1.176 | .872 | " | | |
| | | | | 1.620 | .100 |
| 4 | + 6.994 | .976 | " | | |
| | | | | | .200 |
| 5 | + 6.667 | 1.000 | " | | |
| | | | | 1.621 | .120 |
| 6 | + 20.000 | 1.000 | " | | |
| | | | | 1.620 | .120 |
| 7 | + 1.206 | 1.000 | " | | |

Column 3, Table II, should appear as shown on the attached sheet.

UNITED STATES PATENT AND TRADEMARK OFFICE
CERTIFICATE OF CORRECTION

PATENT NO. : 4,362,366

DATED : December 7, 1982

INVENTOR(S) : Robert E. Gottschalk

Page 2 of 2

It is certified that error appears in the above-identified patent and that said Letters Patent is hereby corrected as shown below:

TABLE II

| SURFACE | RADII | WIDTH | HEIGHT | DIAGONAL | INDEX OF REFRACTION | DISTANCE |
|---------|---------|-------|--------|----------|---------------------|----------|
| A | − 9.524 | 3.330 | 1.900 | 3.834 | | .620 |
| | | | | | 1.620 | |
| B | + 7.143 | 3.434 | 2.102 | 4.026 | | .400 |
| | | | | | 1.621 | |
| C | PLANO | 3.674 | 2.230 | 4.300 | | .250 |
| D | + 17.551 | 3.772 | 2.364 | 4.450 | | .600 |
| | | | | | 1.621 | |
| E | + 4.307 | 3.888 | 2.556 | 4.653 | | 1.072 |
| F | + 3.571 | 4.044 | 3.126 | 5.111 | | .500 |
| | | | | | 1.620 | |
| G | + 18.845 | 4.636 | 3.286 | 5.682 | | .800 |
| H | + 3.846 | 4.740 | 3.712 | 6.020 | | .600 |
| | | | | | 1.620 | |
| I | + 8.431 | 5.946 | 3.906 | 7.114 | | |

Signed and Sealed this

*Twenty-second* Day of *March 1983*

[SEAL]

*Attest:*

*Attesting Officer*

GERALD J. MOSSINGHOFF

*Commissioner of Patents and Trademarks*